C. O. NEWBURGH.
STEAM SEPARATOR.
APPLICATION FILED OCT. 17, 1918.
1,311,573.
Patented July 29, 1919.
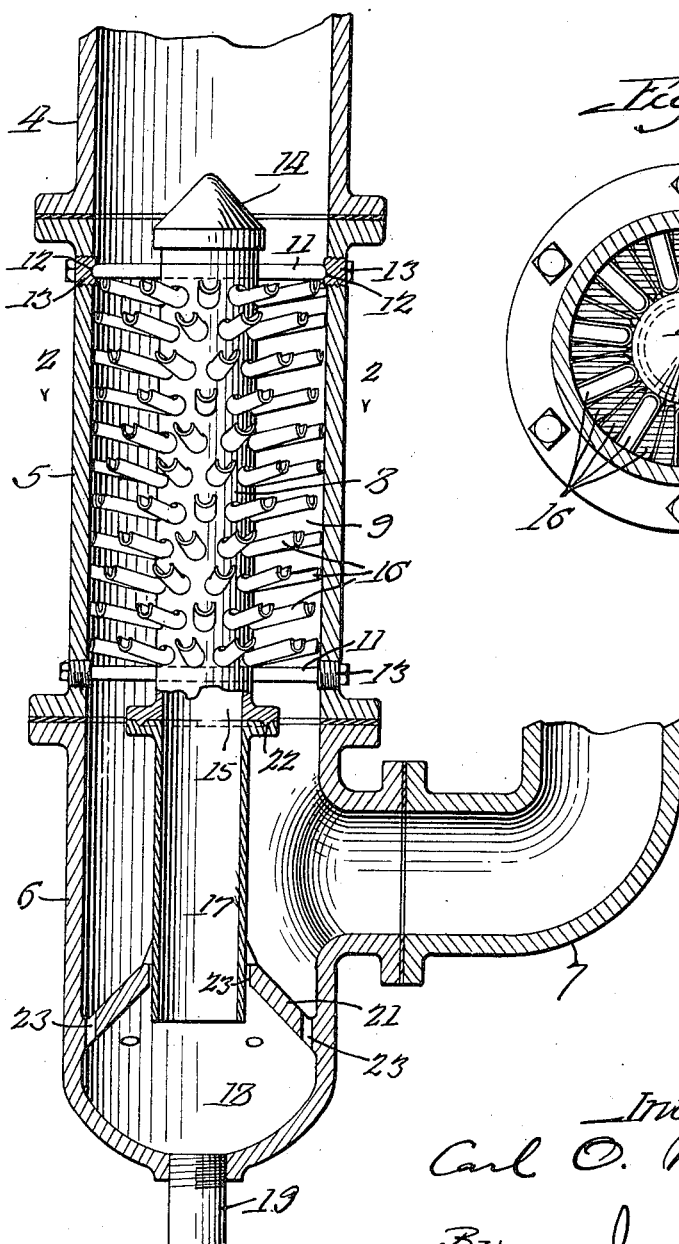
Inventor:
Carl O. Newburgh
By Ira J. Wilson
Atty.

UNITED STATES PATENT OFFICE.

CARL O. NEWBURGH, OF ROCKFORD, ILLINOIS, ASSIGNOR OF ONE-HALF TO ARTHUR C. JOHNSON, OF ROCKFORD, ILLINOIS.

STEAM-SEPARATOR.

1,311,573.  Specification of Letters Patent.  Patented July 29, 1919.

Application filed October 17, 1918. Serial No. 258,598.

*To all whom it may concern:*

Be it known that I, CARL O. NEWBURGH, a citizen of the United States, residing at Rockford, in the county of Winnebago and State of Illinois, have invented certain new and useful Improvements in Steam-Separators, of which the following is a specification.

This invention pertains to steam separators adapted to be interposed in steam pipe lines for removing grease, dirt, water and other foreign matter from the steam so as to render it clean and dry. Under certain working conditions the steam is quite heavily laden with foreign matter and the object of clarifying this steam without appreciably lowering its pressure is difficult to attain because of the peculiar conditions present. Such working condition is especially present when low pressure or exhaust steam from steam hammers, presses, etc., is used for operating turbines. The exhaust steam carries an unusually large percentage of grease, grit, etc., which if not entirely separated from the steam, will sooner or later seriously wear, clog and injure the turbine, thus necessitating frequent dismantling, cleaning and repairing the same.

It has been found that the separators now on the market are very inefficient under the conditions mentioned as they not only fail to entirely separate the foreign matter from the steam, but they impose such an obstruction to its passage as to lower the pressure.

The primary object of the present invention is to overcome these objections by the provision of a separator of novel construction which will thoroughly remove all foreign matter from the steam without lowering the pressure.

I have also aimed to provide a steam separator of such simple design and construction as to warrant its production at a comparatively low cost.

A further object is to provide a steam separator constructed so that it may be quickly and easily removed from a pipe line for cleaning purposes, for in time certain particles will accumulate and adhere to the separator element instead of being drained or carried away with the bulk of foreign matter to a trap or reservoir. In the present instance, the separator element may be removed as an entirety and the accumulation burned off very quickly.

Other objects and attendant advantages will be appreciated as the invention becomes better understood by reference to the following description when considered in connection with the accompanying drawings, in which—

Figure 1 is a vertical sectional view through a steam separator embodying my improvements, showing the separator elements in elevation; and Fig. 2 is a plan sectional view taken on the line 2—2 of Fig. 1.

My improved steam separator is adapted to be interposed in any steam pipe line in which it is desired to remove moisture, oil, or any foreign matter from the steam, and as mentioned above, it is particularly serviceable and efficient under the most severe conditions. That is, in the case of low pressure exhaust steam taken from steam presses, hammers, etc., where an unusually large amount of oil, dirt and other foreign matter is gathered by the steam, my improved separator will thoroughly remove this foreign matter from the steam, and in such a way as not to lower the steam pressure.

In the present illustration of my improvement, the steam pipe line includes sections 4, 5, 6 and 7. This is intended to exemplify a section of any steam line. In the particular illustration mentioned, the pipe section 4 leads from the hammers, presses or other source of exhaust steam, and the steam after having been clarified is delivered through the section 7 to the point of usage, as to a steam turbine. The section 5, which incloses the separator is preferably flanged at its ends and bolted between the adjoining pipe sections so as to be readily removable and also to provide a straight uninterrupted passage for the steam. Centrally within the pipe section 5 is rigidly but detachably mounted a tubular body 8, allowing a circumferential steam passage 9 through said pipe section. This tubular body may be held in the desired position by any suitable means, and in the present case is so held by upper and lower rods 11 extending diametrically through and rigidly secured to the tubular body and seated at their ends in sockets 12 in plugs 13 threadingly engaged in the pipe section 5. When the section 5 is removed from the pipe line the tubular member 8 may be removed lengthwise by loosening the plugs 13, as will be obvious. The tubular member 8 constitutes a central conduit closed at its end 14 and open at its end 15 and adapted to receive foreign matter extracted from the steam as it passes through the passage 9 and deliver such foreign matter through the outlet 15 to a trap, reservoir or other suitable container.

My invention contemplates the provision of novel means for extracting this foreign matter from the steam, consisting of a plurality of separator blades spirally arranged in the passage 9 for intercepting the foreign matter and delivering it into the central conduit without lowering the steam pressure. These separator blades may be of suitable construction and are preferably arranged radially in the passage 9 and spaced circumferentially around the central member 8 in spiral rows, as clearly illustrated in Fig. 1. Each blade has an open face in the path of the steam and a channel leading into the central conduit. The foreign matter intercepted by these faces will be guided through the channels into the central conduit, thence conveyed to an outlet. A simple and effectual form of blade is that shown, consisting of pipe sections 16 secured in an opening through the tubular member and extending radially therefrom and inclined toward the incoming steam. The upper face of each radial pipe is cut away, thus leaving an open channel leading into the central conduit. As shown clearly in Fig. 2, these open face channels of the separator blades intercept the entire cross-sectional area of the passage 9, but due to the spiral arrangement of the blades at a relatively high or steep pitch, the steam as it passes through the passage 9 will not be obstructed to the extent of lowering its pressure. The steam body will substantially follow the spiral path of the blades, and in so doing the foreign particles will at some time in their passage through this blade area be intercepted by the blades and carried into the central conduit. The separated matter will drain down through the pipe 17 into the trap 18 and thence through the outlet 19 to any suitable steam-tight receptacle.

While I have shown in this particular case, a trap 18 formed integral with one of the sections of the pipe line, it should be understood that this is not essential to my improvement, but it does provide a simple construction where a compact unit is desired. In this case, the trap 18 is divided from the steam pipe line by the partition wall 21 and the pipe section 17 is removably mounted on the wall 21. The lower end of the turbine member is seated on the pipe section 17 and the meeting edges have an annular interlocking V-shaped groove and recesses 22. Steam delivered into the trap 18 through the pipe 17 returns to the main passage through the openings 23.

In operation, it is found that even though the steam is under low pressure, my improved separating device does not affect the pressure as is the case with those steam separators in which the steam is passed over a series of baffles or through a series of compartments. In addition to this advantage, the steam is clarified in the most thorough manner. By delivering the steam clear, clean and dry to a turbine, the efficiency of the latter is increased, and the ports and blades are not clogged as in the case where oil and dirt laden steam is delivered into the turbine and ground into the working parts. After a long period of usage, or whenever necessary, the pipe section 5 may be removed from the pipe line and the separator section removed for cleaning. The blades may be very effectually cleaned by placing the entire separator-section in a furnace in which these particles will be burned off in a very short time.

It is believed that the foregoing conveys a clear understanding of the objects prefaced above, and while I have illustrated but a single working embodiment of my improvement, it should be understood that various changes might be made in the construction and arrangement without departing from the spirit and scope of the invention as expressed in the appended claims in which:

I claim:

1. A steam separator comprising a steam passage, a closed conduit centrally within said steam passage, and a plurality of separator blades extending outwardly from the central conduit for extracting foreign matter from the steam passing through said passage and for guiding such foreign matter into the central conduit, the separator blades being arranged in spiral rows at a relatively high or steep pitch about the central conduit to minimize the resistance to the steam in its passage through the separator area.

2. A steam separator comprising a steam conduit having a plurality of substantially radially extending separator blades within the same for removing foreign matter from the steam and arranged in spiral rows at a relatively high or steep pitch so as to define pronounced spiral passages permitting passage of steam through the separator without appreciably reducing the steam pressure.

3. A steam separator of the character described comprising a steam pipe line having a removable section open from end to end, the steam passage through said section being uninterrupted except for an axial conduit closed at the inlet end of the passage and leading at its opposite end to a trap or drain, and a plurality of separator blades communicating with the central conduit and extending outwardly therefrom and in spiral rows thereabout at a comparatively high or steep pitch whereby to extract foreign matter from the steam and deliver such matter into the central conduit without appreciably lowering the steam pressure.

4. A steam separator comprising a steam pipe line including a vertical section through which the steam passes and terminating at its lower end in a trap or drain and having a main steam outlet above the trap, the pipe section immediately above and adjoining the trap section constituting a separator section, and a separator within this section comprising a central conduit and separator blades extending outwardly therefrom and arranged in spiral rows for extracting foreign matter from the steam as it passes through said section and for delivering such matter into the central conduit and arranged at a comparatively high pitch so as not to appreciably lower the steam pressure, said central conduit being constructed to deliver into said trap.

5. A steam separator comprising a pipe line having a vertically extending portion down through which the steam passes, one pipe section of which is bodily removable from the adjoining sections and constitutes a separator unit, a central conduit supported by and within said removable pipe section and communicating with a conduit leading to the exterior of the steam pipe line, and spiral rows of separator blades within said removable section extending outwardly from the central conduit for separating foreign matter from the steam and conveying such matter to the central conduit.

6. A steam separator of the character described comprising a vertically extending pipe down through which the steam passes, a central conduit within the pipe, horizontal rows of separator blades about the central conduit with the blades extending outwardly from such conduit and so relatively arranged that the blades of the successive horizontal rows form vertically extending spiral rows at a relatively high or steep pitch and defining pronounced spiral passages so as not to appreciably lower the steam pressure.

7. A steam separator of the character described comprising a vertically extending pipe down through which the steam passes, a discharge conduit extending longitudinally of the pipe, and spiral rows of separator blades extending in a substantially radial direction in the steam pipe and being so proportioned and arranged that the open cross sectional area between each two adjacent blades at the steam entrance end will be jointly occupied by a plurality of succeeding separator blades which jointly present their separator faces to said open area.

CARL O. NEWBURGH.

Copies of this patent may be obtained for five cents each, by addressing the "Commissioner of Patents, Washington, D. C."